US012566648B2

(12) United States Patent
Ma et al.

(10) Patent No.: US 12,566,648 B2
(45) Date of Patent: Mar. 3, 2026

(54) METHOD OF PROCESSING AGREEMENT TASK

(71) Applicants:Beijing BOE Technology Development Co., Ltd., Beijing (CN); BOE TECHNOLOGY GROUP CO., LTD., Beijing (CN)

(72) Inventors: Mingyuan Ma, Beijing (CN); Hongxiang Shen, Beijing (CN)

(73) Assignees: Beijing BOE Technology Development Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 492 days.

(21) Appl. No.: 18/006,191

(22) PCT Filed: Jan. 30, 2022

(86) PCT No.: PCT/CN2022/075155
§ 371 (c)(1),
(2) Date: Jan. 20, 2023

(87) PCT Pub. No.: WO2023/142098
PCT Pub. Date: Aug. 3, 2023

(65) Prior Publication Data
US 2024/0160505 A1     May 16, 2024

(51) Int. Cl.
*G06F 9/54* (2006.01)
*H04L 9/32* (2006.01)
(52) U.S. Cl.
CPC ............ *G06F 9/542* (2013.01); *H04L 9/3247* (2013.01); *H04L 9/3263* (2013.01)
(58) Field of Classification Search
CPC .......... G06F 9/542; G06F 16/27; G06F 21/64; H04L 9/3247; H04L 9/3263; H04L 9/3239; H04L 9/50; G06Q 40/04
See application file for complete search history.

(56) References Cited

U.S. PATENT DOCUMENTS

2017/0093695 A1*  3/2017  Kebler ................. H04L 67/535
2017/0250815 A1*  8/2017  Cuende ............... G06Q 20/401
(Continued)

FOREIGN PATENT DOCUMENTS

CN     109859001 A     6/2019
CN     110046907 A     7/2019
(Continued)

OTHER PUBLICATIONS

"Blockchain-based rental platform cloud service and housing information sharing network," Master's degree thesis of Zhejiang Normal University, (C) 1994-2022 China Academic Journal Electronic Publishing House. All rights reserved, http://www.cnki.net, 103 pages.
(Continued)

*Primary Examiner* — Tuan C Dao
(74) *Attorney, Agent, or Firm* — Westman, Champlin & Koehler, P.A.

(57) ABSTRACT

The present disclosure provides a method of processing an agreement task, which relates to a field of an Internet technology. The method includes: determining, in response to an acquired agreement task request, a task event model and task event data associated with the agreement task request as an event configuration information; calling a target smart contract associated with the event configuration information, so as to generate an agreement task event matching the agreement task request based on the target smart contract; performing, in response to acquired event response data of a target business node for the agreement task event, a legitimacy verification on the event response data; and on-chaining, in response to the verification being successful, the agreement task event and the event response data in a blockchain.

19 Claims, 7 Drawing Sheets

200

In response to an acquired agreement task request, a task event model and task event data associated with the agreement task request are determined as an event configuration information — S210

A target smart contract associated with the event configuration information is called, so as to generate an agreement task event matching the agreement task request based on the target smart contract — S220

In response to acquired event response data of a target business node for the agreement task event, a legitimacy verification is performed on the event response data — S230

In response to the verification being successful, the agreement task event and the event response data are on-chained in a blockchain — S240

(56) References Cited

U.S. PATENT DOCUMENTS

| | | | | |
|---|---|---|---|---|
| 2017/0255950 | A1* | 9/2017 | Krug | G06Q 30/0202 |
| 2018/0032941 | A1* | 2/2018 | Naous | G06Q 10/06393 |
| 2018/0158162 | A1* | 6/2018 | Ramasamy | H04L 9/3239 |
| 2018/0260909 | A1* | 9/2018 | Li | G06Q 20/38215 |
| 2020/0184556 | A1* | 6/2020 | Cella | H04L 9/3239 |
| 2020/0294128 | A1* | 9/2020 | Cella | H04L 9/3239 |
| 2020/0294165 | A1* | 9/2020 | Yang | G06F 21/64 |
| 2021/0049715 | A1 | 2/2021 | Qiu et al. | |
| 2021/0110605 | A1* | 4/2021 | Haslam | G06T 7/11 |
| 2021/0124575 | A1 | 4/2021 | Bell, IV et al. | |
| 2021/0300423 | A1* | 9/2021 | Ahire | B60W 50/14 |
| 2021/0314136 | A1* | 10/2021 | Huang | G16Y 40/10 |
| 2022/0188810 | A1* | 6/2022 | Doney | G06Q 20/405 |
| 2023/0096163 | A1* | 3/2023 | Narayanam | G06Q 30/04 705/7.25 |
| 2023/0118380 | A1* | 4/2023 | Krosinski | G06Q 20/405 705/44 |
| 2023/0262126 | A1* | 8/2023 | Liu | H04L 9/50 709/203 |
| 2024/0054141 | A1* | 2/2024 | Badr | H04L 9/50 |

FOREIGN PATENT DOCUMENTS

| | | |
|---|---|---|
| CN | 110111078 A | 8/2019 |
| CN | 110362969 A | 10/2019 |
| CN | 110674523 A | 1/2020 |
| CN | 111159304 A | 5/2020 |
| CN | 111177797 A | 5/2020 |
| CN | 111224788 A | 6/2020 |
| CN | 111415231 A | 7/2020 |
| CN | 111985007 A | 11/2020 |
| CN | 112232989 A | 1/2021 |
| CN | 112347190 A | 2/2021 |
| WO | 2020029381 A1 | 2/2020 |

OTHER PUBLICATIONS

"The Fourth Chapter The Realization of Renting System Based on Blockchain," Master of Engineering Dissertation of Beijing University of Posts and Telecommunications, (C) 1994-2022 China Academic Journal Electronic Publishing House. All rights reserved, http://www.cnki.net, 54 pages.

Shequ Wuye Guanli, "Community property management: a series of teaching materials on community governance," Guangdong Higher Education Press, ISBN 978-7-5361-5433-9, http://www.gdgjs.com.cn, Dec. 1, 2015, 13 pages.

* cited by examiner

100

101

105

102

104

103

200

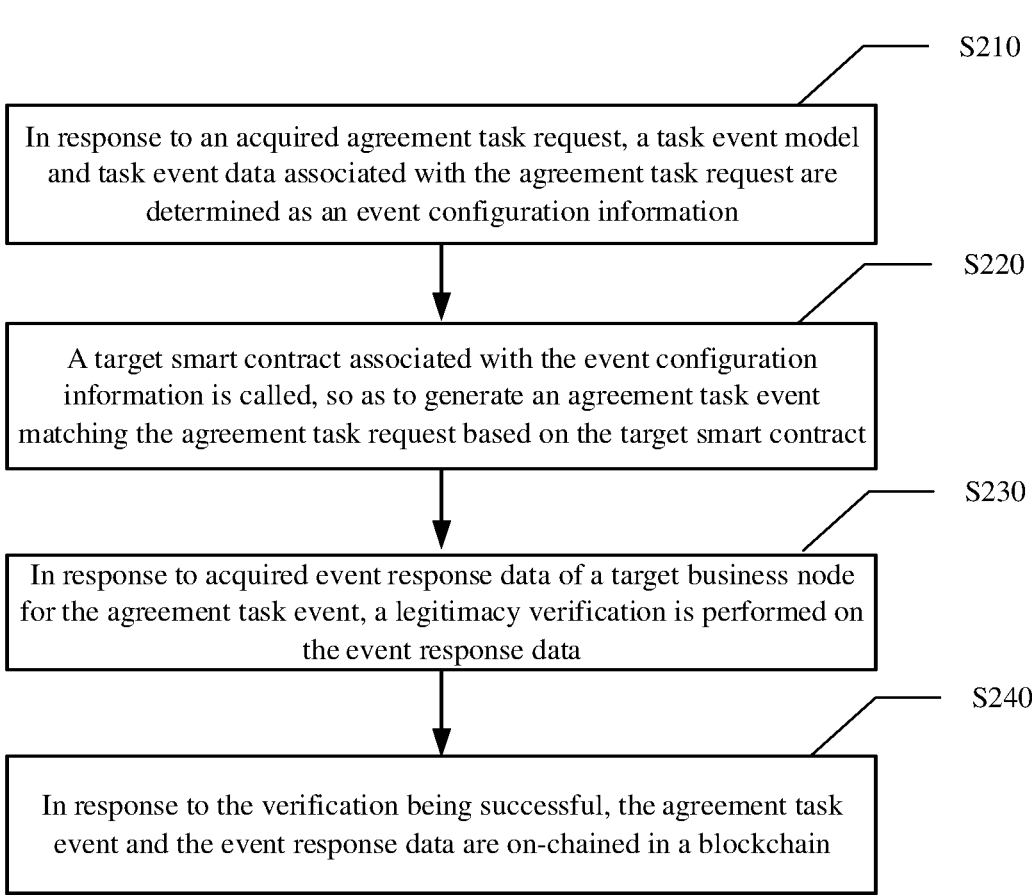

S210

In response to an acquired agreement task request, a task event model and task event data associated with the agreement task request are determined as an event configuration information

S220

A target smart contract associated with the event configuration information is called, so as to generate an agreement task event matching the agreement task request based on the target smart contract

S230

In response to acquired event response data of a target business node for the agreement task event, a legitimacy verification is performed on the event response data

S240

In response to the verification being successful, the agreement task event and the event response data are on-chained in a blockchain

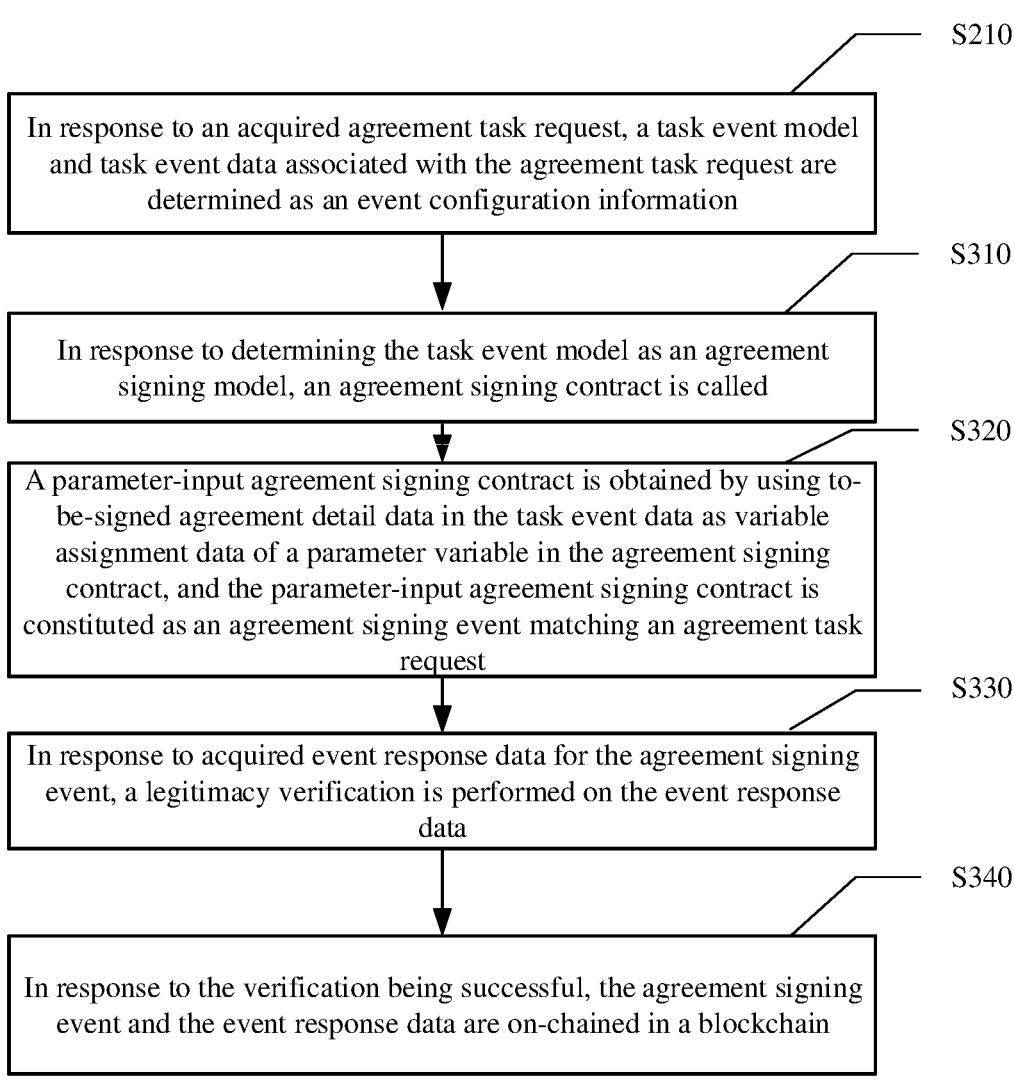

In response to an acquired agreement task request, a task event model and task event data associated with the agreement task request are determined as an event configuration information In response to determining the task event model as an agreement signing model, an agreement signing contract is called A parameter-input agreement signing contract is obtained by using to-be-signed agreement detail data in the task event data as variable assignment data of a parameter variable in the agreement signing contract, and the parameter-input agreement signing contract is constituted as an agreement signing event matching an agreement task request In response to acquired event response data for the agreement signing event, a legitimacy verification is performed on the event response data In response to the verification being successful, the agreement signing event and the event response data are on-chained in a blockchain

FIG. 3

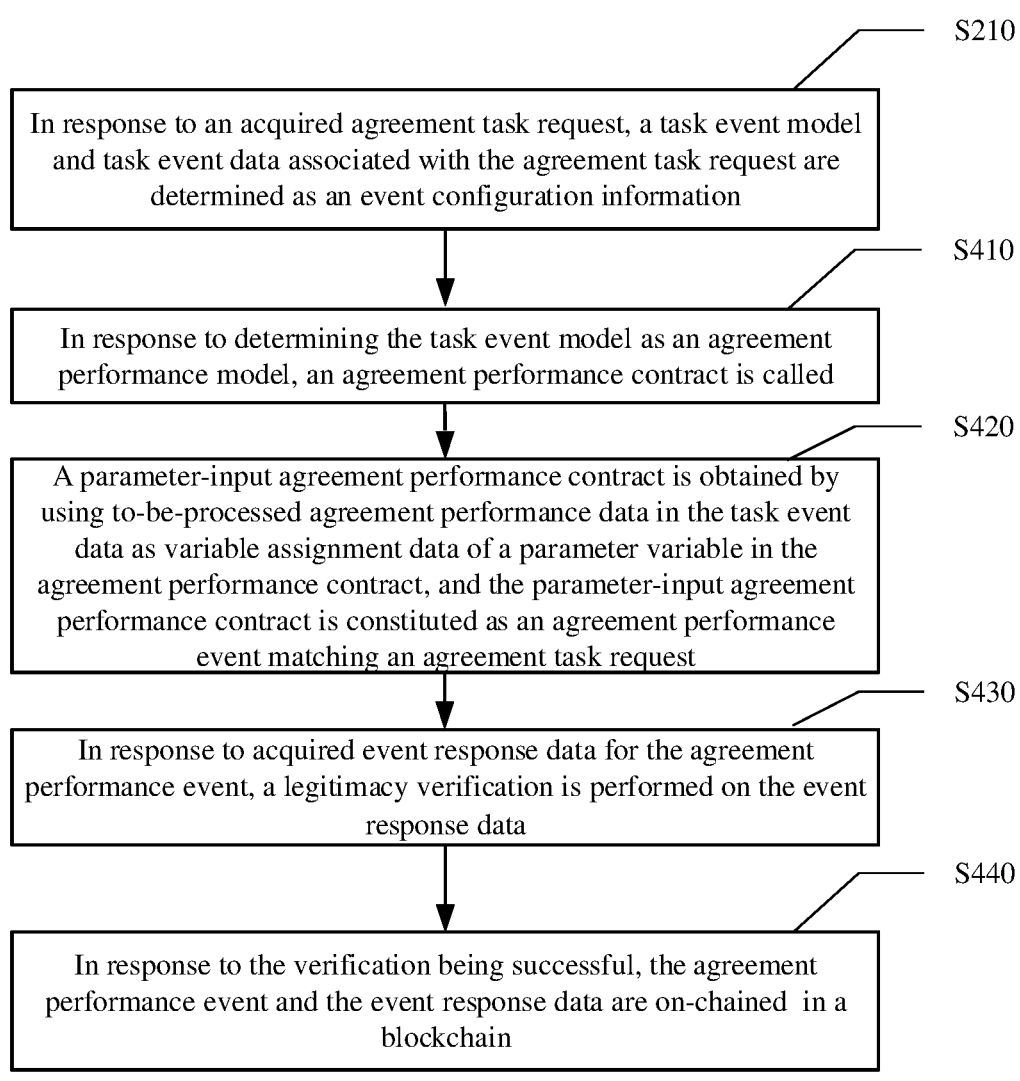

400

S210

In response to an acquired agreement task request, a task event model and task event data associated with the agreement task request are determined as an event configuration information

S410

In response to determining the task event model as an agreement performance model, an agreement performance contract is called

S420

A parameter-input agreement performance contract is obtained by using to-be-processed agreement performance data in the task event data as variable assignment data of a parameter variable in the agreement performance contract, and the parameter-input agreement performance contract is constituted as an agreement performance event matching an agreement task request

S430

In response to acquired event response data for the agreement performance event, a legitimacy verification is performed on the event response data

S440

In response to the verification being successful, the agreement performance event and the event response data are on-chained in a blockchain

METHOD OF PROCESSING AGREEMENT TASK

CROSS REFERENCE TO RELATED APPLICATION(S)

This application is a Section 371 National Stage Application of International Application No. PCT/CN2022/075155, filed on Jan. 30, 2022, entitled "METHOD AND APPARATUS OF PROCESSING AGREEMENT TASK", the entire content of which is incorporated herein by reference in its entirety.

TECHNICAL FIELD

The present disclosure relates to a field of an Internet technology, and relates to a method and an apparatus of processing an agreement task, an electronic device, a computer-readable storage medium and a computer program product.

BACKGROUND

A business information may be transferred quickly and timely through the Internet. With a rapid growth of an amount of the business information, a phenomenon of a low transparency of information, a great difficulty in an authenticity verification, and a susceptibility of the information to be tampered may occur, which may affect a business processing efficiency, such as affecting an agreement task processing efficiency, and reduce a credibility and a security of an agreement task processing result.

SUMMARY

The present disclosure provides a method of processing an agreement task, an electronic device, and a computer-readable storage medium.

According to embodiments of the present disclosure, a method of processing agreement tasks is provided, including: determining, in response to an acquired agreement task request, a task event model and task event data associated with the agreement task request as an event configuration information; calling a target smart contract associated with the event configuration information, so as to generate an agreement task event matching the agreement task request based on the target smart contract; performing, in response to acquired event response data of a target business node for the agreement task event, a legitimacy verification on the event response data; and chaining, in response to the verification being successful, the agreement task event and the event response data in a blockchain.

According to embodiments of the present disclosure, an electronic device is provided, including: at least one processor; and a memory communicatively connected to the at least one processor; wherein the memory stores instructions executable by the at least one processor, and the instructions, when executed by the at least one processor, cause the at least one processor to implement the method provided according to the present disclosure.

According to embodiments of the present disclosure, a non-transitory computer-readable storage medium having computer instructions therein is provided, and the computer instructions are configured to cause a computer to implement the method provided according to the present disclosure.

It should be understood that content described in this section is not intended to identify key or important features in embodiments of the present disclosure, nor is it intended to limit the scope of the present disclosure. Other features of the present disclosure will be easily understood through the following description.

BRIEF DESCRIPTION OF THE DRAWINGS

The accompanying drawings are used for better understanding of the solution and do not constitute a limitation to the present disclosure, wherein:

FIG. 2 schematically shows a flowchart of a method of processing an agreement task according to embodiments of the present disclosure;

FIG. 3 schematically shows a flowchart of a method of processing another agreement task according to embodiments of the present disclosure;

FIG. 4 schematically shows a flowchart of a method of processing another agreement task according to embodiments of the present disclosure;

DETAILED DESCRIPTION OF EMBODIMENTS

Exemplary embodiments of the present disclosure will be described below with reference to the accompanying drawings, which include various details of embodiments of the present disclosure to facilitate understanding and should be considered as merely exemplary. Therefore, those of ordinary skilled in the art should realize that various changes and modifications may be made to such embodiments described herein without departing from the scope and spirit of the present disclosure. Likewise, for clarity and conciseness, descriptions of well-known functions and structures are omitted in the following description.

Figure 1:
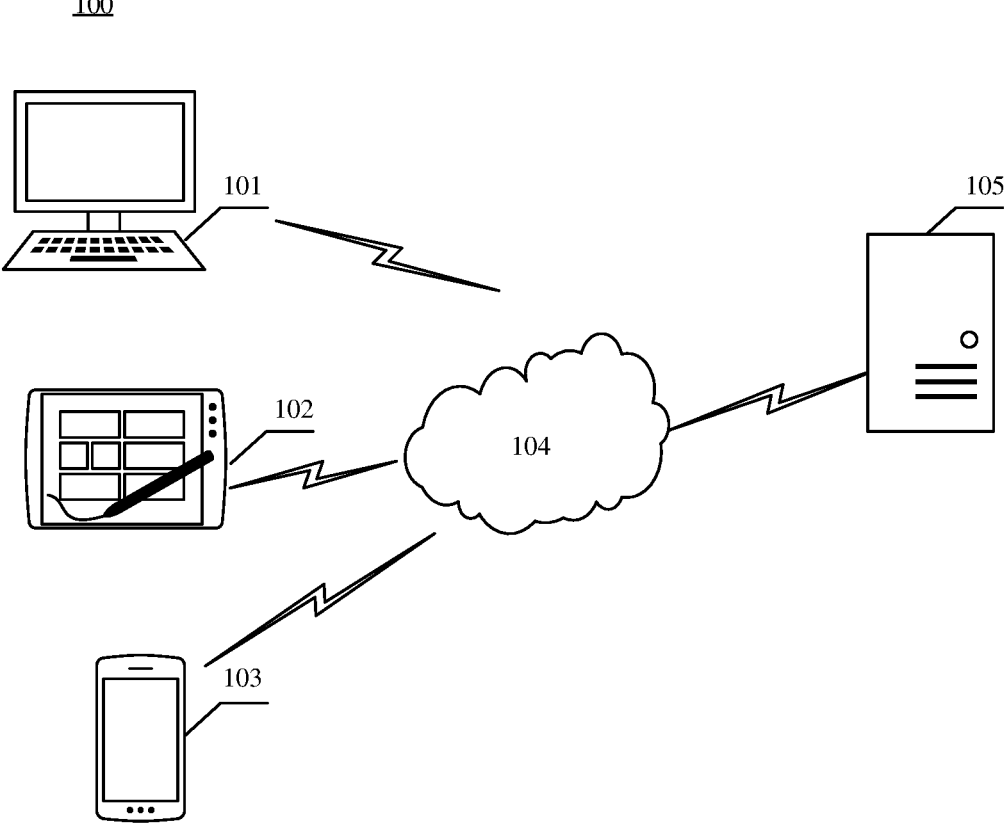
FIG. 1 schematically shows an exemplary business framework schematic diagram of a method and an apparatus of processing an agreement task according to embodiments of the present disclosure.

FIG. 1 schematically shows an exemplary business framework schematic diagram of a method and an apparatus of processing an agreement task according to embodiments of the present disclosure. It should be noted that FIG. 1 is only an example of a business system architecture to which embodiments of the present disclosure may be applied, so as to help those skilled in the art understand the technical content of the present disclosure, but it does not mean that embodiments of the present disclosure may not be applied to other devices, systems, environments or scenarios.

As shown in FIG. 1, a business framework 100 according to such embodiments may include application sides (FIG. 1 shows a plurality of application sides, such as application sides 101, 102, and 103), a network 104, and a blockchain node 105. The network 104 is a medium used to provide a communication link between the application sides (such as the application sides 101, 102, and 103) and the blockchain node 105. The network 104 may include various connection types, such as wired and wireless communication links, or optical fiber cables, etc.

The application sides 101, 102 and 103 may be used as access nodes of a blockchain. Object data associated with the application sides may be distributed and stored in the blockchain in a form of data blocks. The object data may include, for example, a housing source information, user identity authentication data, lease agreement data, service agreement data, post-lease service record data, bill payment record data, and rent payment record data, etc.

Exemplarily, the blockchain node 105 determines, in response to an agreement task request acquired from the application side (such as the application side 101), a task event model and task event data associated with the agreement task request as an event configuration information; calls a target smart contract associated with the event configuration information, so as to generate an agreement task event matching the agreement task request based on the target smart contract; performs, in response to acquired event response data of a target business node for the agreement task event, a legitimacy verification on the event response data; and chains, in response to the verification being successful, the agreement task event and the event response data in a blockchain.

It should be understood that the number of the application sides, network and blockchain node in FIG. 1 is only schematic. According to implementation needs, any number of application sides, networks and blockchain nodes may be provided.

FIG. 2 schematically shows a flowchart of a method of processing an agreement task according to embodiments of the present disclosure.

As shown in FIG. 2, a method 200 of processing an agreement task may include, for example, operations S210 to S240.

In operation S210, in response to an acquired agreement task request, a task event model and task event data associated with the agreement task request are determined as an event configuration information.

In operation S220, a target smart contract associated with the event configuration information is called, so as to generate an agreement task event matching the agreement task request based on the target smart contract.

In operation S230, in response to acquired event response data of a target business node for the agreement task event, a legitimacy verification is performed on the event response data.

In operation S240, in response to the verification being successful, the agreement task event and the event response data are chained in a blockchain.

An example process of steps of the method of processing the agreement task according to such embodiments will be exemplarily described below.

According to embodiments of the present disclosure, the event configuration information associated with the agreement task request is determined in response to the acquired agreement task request. For example, the task event model and the task event data associated with the agreement task request are determined as the event configuration information according to the acquired agreement task request. The task event model may include, for example, a government affair type model, a housing source management model, an agreement signing model, and an agreement performance model, etc. The agreement performance model may include, for example, an agreement change model, an agreement termination model, a rent payment model, a financial service model, and a post-lease life service model, etc.

The government affair type model may include, for example, a housing source verification model, an agreement filing model, a lease policy query model, etc. The housing management model may include, for example, a user identity authentication model, a housing source information release model, a housing source information management model, an appointment house-viewing model, etc. Exemplarily, a user may initiate an application for a housing source release on an application platform, and a lease supervision node in the blockchain may verify whether a house-owner information meets a release qualification, whether the housing source information is true, etc.

The agreement signing model may include, for example, a lease agreement signing model and a service agreement signing model. A user whose identity authentication is successful may initiate an online signing on the application platform. After the signing takes effect, an agreement may be synchronously filed in the blockchain. The rent payment model may include, for example, an agreement down payment model, a rent payment model, a deposit management model, etc. The financial service model may include, for example, a life payment, etc., and the life payment may include water, electricity and coal bill payments. The post-lease life service model may include, for example, a life service appointment model, a life service execution model, a life service verification model, etc. The life service may include, for example, a cleaning service, a maintenance service, etc.

Exemplarily, when the housing source information is released through the application platform, in response to an acquired housing source release request, a house leasing node in the blockchain calculates a target hash value according to a housing source location information, a lease price information, and a lease time information in the housing source release request. The house leasing node references a hash value of a previous block in a blockchain record list, and generates a block head according to the hash value of the previous block, the target hash value, and a current time-stamp. A block body is generated according to a housing source identification information, the housing source location information, the lease price information, and the lease time information. The block head and the block body constitute a housing source information block. The house leasing node broadcasts a chained housing source information block in the blockchain, so that each node in the blockchain updates an information in the housing source information block to a blockchain record list of the node.

In response to the acquired agreement task request, the task event data associated with the agreement task request is determined as the event configuration information. The task event data may include business data used to fulfill the agreement task request. For example, when the agreement task request is a lease agreement signing request, task event data associated with the lease agreement signing request may include, for example, a lessor's identity information, a lessee's identity information, a housing source location information, a lease price information, and a lease time information, etc.

The agreement task may be related to a plurality of business data, and a certain data reference relationship may exist between the plurality of business data. When each business node in the blockchain processes an agreement task carried, in addition to storing the business data associated with the agreement task, a data reference relationship associated with the business data may also be stored by filling source data referenced by the business data into a reference field. The business data stored in each business node may follow a preset standard data structure. The standard data structure may include, for example, a data content of the business data and the data reference relationship.

When the source data referenced by the business data is filled into the reference field, a data digest of the source data may be calculated such as calculating a hash value of the source data, and the hash value of the source data is filled into the reference field. In addition, an original data content of the source data may also be directly filled into the reference field.

The task event data associated with the agreement task request may include not only the business data associated with the agreement task, but also the source data referenced by the business data. In addition, the source data referenced by the business data may also constitute authentication data referenced by the agreement task request. A business verification may be performed on the agreement task request according to the authentication data referenced by the agreement task request, and in response to the business verification being successful, an operation of generating the agreement task event matching the agreement task request may be performed.

The authentication data may include authentication root data and non-authentication root data. The authentication root data may include property right certification data which is pre-certified by a property right certification authority. The non-certification root data may include at least one of: housing source number data referencing the property right certification data, lease agreement data referencing the housing source number data, and service agreement data referencing the housing source number data and/or the lease agreement data.

The business verification performed according to the certification data referenced by the agreement task request may be independently verified on the premise of reducing a dependence on external data. A data tracing may be performed according to the certification data referenced by the agreement task request, and the agreement task request is verified based on a data tracing result, which may be conducive to improving an authenticity and a credibility of a task request verification.

The agreement task event is generated according to the task event model and the task event data associated with the agreement task request, so that the target business node in the blockchain may respond to a task event after listening to the agreement task event. Exemplarily, the target smart contract matching the agreement task request may be determined according to the task event model. A parameter-input target smart contract is obtained by using the task event data as variable assignment data of a parameter variable in the target smart contract, and the parameter-input target smart contract is constituted as the agreement task event matching the agreement task request.

The target smart contract indicates a business processing logic matching the task event model. As an example, a call notification for the parameter-input target smart contract is sent to the target business node, so that the target business node calls the parameter-input target smart contract and responds to the task event based on the business processing logic.

In response to the acquired event response data for the agreement task event, the legitimacy verification is performed on the event response data. In response to the verification being successful, the agreement task event and the event response data are chained in the blockchain. The event response data may include behavior record data and result record data associated with the agreement task event. When the legitimacy verification is performed on the event response data, the legitimacy verification may be performed on the behavior record data and/or the result record data associated with the agreement task event, so as to obtain a verification result for the event response data.

When the legitimacy verification for the event response data is successful, the agreement task event and the event response data may be chained in the blockchain. Exemplarily, the agreement task event and the event response data may be released in the blockchain, and a consensus node in the blockchain may perform a consensus processing. After the consensus processing is successful, the agreement task event and the event response data may be stored in a specific block of the blockchain, so as to complete a storage operation of the agreement task event and the event response data in the blockchain. The consensus processing process may be achieved based on a consensus algorithm supported by the blockchain, which will not be limited in such embodiments.

When the agreement task event and the event response data are chained in the blockchain, a target hash value may be calculated according to the agreement task event and the event response data. According to a referenced hash value of a previous block in a blockchain record list, a block head is generated based on a hash value of the previous block, the target hash value and a timestamp. A block body is generated based on the agreement task event and the event response data. The block head and the block body constitute an agreement task block. The agreement task block is chained in the blockchain. A chained agreement task block is broadcast in the blockchain, so that each node in the blockchain updates a record information in the agreement task block to a blockchain list of the node.

As an example, a query may be initiated by using a data digest of the authentication data referenced by the agreement task request as a query index, so as to obtain other agreement task events referencing the authentication data. The other agreement task events and the agreement task event matching the agreement task request are recorded into a business data chain in which the authentication data is used as a root node.

For example, when the authentication data referenced by the agreement task request is the housing source number data, the query may be initiated in the blockchain by using the housing source number data as the query index, so as to obtain other agreement task events referencing the housing source number data. The other agreement task events and the agreement task event generated this time are recorded into a business data chain in which the housing source number data is used as the root node.

According to embodiments of the present disclosure, in response to the acquired agreement task request, the task event model and the task event data associated with the agreement task request are determined as the event configuration information; the target smart contract associated with the event configuration information is called to generate the agreement task event matching the agreement task request based on the target smart contract; in response to the acquired event response data of the target business node for the agreement task event, the legitimacy verification is performed on the event response data; and in response to the verification being successful, the agreement task event and the event response data are chained in the blockchain.

The agreement task event matching the agreement task request is generated according to the event configuration information associated with the agreement task request, so that the target business node in the blockchain may respond to a task event after listening to the agreement task event, which may effectively improve an efficiency of an agreement task processing and improve an automation level and an intelligence level of the agreement task processing. The legitimacy verification for the event response data may effectively ensure an authenticity of the event response data, and may effectively improve a security and a credibility of the agreement task processing. The agreement task processing performed based on the blockchain may effectively ensure a transparency of the agreement task processing, may effectively achieve a sharing and a synchronization of an agreement task information, and may be conductive to achieving an efficient and reliable agreement task processing process.

FIG. 3 schematically shows a flowchart of a method of processing another agreement task according to embodiments of the present disclosure.

As shown in FIG. 3, a method 300 may include operation S210 and operations S310 to S340.

In operation S210, in response to an acquired agreement task request, a task event model and task event data associated with the agreement task request are determined as an event configuration information.

In operation S310, in response to determining the task event model as an agreement signing model, an agreement signing contract is called.

In operation S320, a parameter-input agreement signing contract is obtained by using to-be-signed agreement detail data in the task event data as variable assignment data of a parameter variable in the agreement signing contract, and the parameter-input agreement signing contract is constituted as an agreement signing event matching the agreement task request.

In operation S330, in response to acquired event response data for the agreement signing event, a legitimacy verification is performed on the event response data.

In the operation S340, in response to the verification being successful, the agreement signing event and the event response data are chained in a blockchain.

An example process of steps of the method of processing the agreement task according to such embodiments will be exemplarily described below.

In response to the acquired agreement task request, a user identity information of a request initiator may be verified to verify whether the request initiator is a legally registered or logged-in user, and to verify whether the request initiator has an initiation authority for the agreement task request. After a user identity authentication for the request initiator is successful, the task event model and the task event data associated with the agreement task request are determined. As an example, an integrity of the task event data may be verified to determine whether the task event data includes a necessary parameter required for the task event model. In addition, a data format of the task event data may also be verified, for example, whether a parameter option in the task event data meets a preset parameter requirement is verified.

After a content verification for the task event data is successful, the target smart contract matching the agreement task request may be determined. A business party may pre-register the task event model in the blockchain, and the task event model may be a general definition of a class of events. An association node in the blockchain may record a mapping relationship between the task event model and an event model identification. In addition, the association node may also record a mapping relationship between the event model identification and a smart contract identification.

Several smart contracts may be pre-deployed in the blockchain. The smart contract may be generated by the business party and uploaded to the blockchain. The smart contract is a computer protocol designed to spread, verify or execute an agreement by an informatization method. The smart contract indicates the business processing logic matching the task event model.

A corresponding relationship between the task event model and the smart contract in the blockchain may be established by correlatively recording the event model identification and the smart contract identification. When the smart contract is registered in the blockchain from a business direction, the blockchain may assign the smart contract identification. The smart contract identification corresponding to the event model identification may be determined according to the event model identification of the task event model associated with the agreement task request, and the smart contract indicated by the smart contract identification may be used as the target smart contract matching the agreement task request.

It may be understood that a one-to-one, one-to-many, or many-to-one corresponding relationship may exist between the task event model and the smart contract. That is, a task event model may correspond to one or more smart contracts, and a smart contract may also correspond to one or more task event models, which will not be limited in such embodiments.

After the target smart contract matching the agreement task request is determined, a parameter-input target smart contract may be obtained by using the task event data as variable assignment data of a parameter variable in the target smart contract, and the parameter-input target smart contract may be constituted as the agreement task event matching the agreement task request.

Exemplarily, when the task event model is the agreement signing model, task event data associated with the agreement signing model includes to-be-signed agreement detail data, and an agreement task event associated with the agreement signing model includes an agreement signing event. In response to determining the task event model as the agreement signing model, an agreement signing contract is called. A parameter-input agreement signing contract is obtained by using the to-be-signed agreement detail data as variable assignment data of a parameter variable in the agreement signing contract. The parameter-input agreement signing contract is constituted as the agreement signing event matching the agreement task request.

In response to acquired event response data of an agreement signatory for the agreement signing event, a first legitimacy verification is performed on the event response data according to contract signing data and a digest hash in the event response data, so as to obtain a first verification result. A second legitimacy verification is performed on the event response data according to a signature information of the agreement signatory in the event response data, so as to obtain a second verification result. In response to both the first verification result and the second verification result indicating that the verification is successful, the legitimacy verification for the event response data is determined to be successful. The contract signing data includes data obtained from a signing of the agreement detail data by the agreement signatory.

When the second legitimacy is performed on the event response data according to the signature information of the agreement signatory in the event response data, an assigned public key of the agreement signatory may be determined according to a user certificate associated with the agreement signatory. The signature information of the agreement signatory is decrypted by using the public key, so as to obtain a first response data hash value. A hash calculation for the event response data is performed according to the agreement signing model and an identification of the agreement signatory, so as to obtain a second response data hash value. In response to the first response data hash value being consistent with the second response data hash value, the second legitimacy verification for the event response data is determined to be successful. The user certificate is generated by a certificate authority according to an identity information of the agreement signatory and the assigned public key.

A lease agreement signing is taken as an example for description. In response to the agreement task request acquired from a lessor application side, the task event model associated with the agreement task request is determined as the lease agreement signing model. The task event data associated with the agreement task request includes the to-be-signed agreement detail data. The agreement detail data may include, for example, a lessor's identity information, a lessee's identity information, a housing source location information, a lease price information, a lease time information, a post-lease service commitment information, a rent payment method detail, and a lessee default information, etc. The agreement signing contract is called, and the parameter-input agreement signing contract is obtained by using the to-be-signed agreement detail data as the variable assignment data of the parameter variable in the agreement signing contract. The parameter-input agreement signing contract is constituted as the lease agreement signing event.

A lessee application node is determined according to the lessee's identity information in the task event data. The lessee's identity information may include, for example, a lessee's account information. The lessee application node constitutes a target business node that is to respond to the lease agreement signing event. An event response notification for the lease agreement signing event is sent to the lessee application node, that is, a call notification for the parameter-input agreement signing contract is sent to the lessee application node, so that the lessee application node calls the parameter-input agreement signing contract and responds to the lease agreement signing event based on a corresponding business processing logic.

The event response data is acquired from the lessee application node. The event response data may include, for example, a signed lease agreement supplemented and confirmed by the lessee application node, and a signature information for the signed lease agreement. The signed lease agreement is contract signing data obtained from a signing of the agreement detail data by the agreement signatory.

The first legitimacy verification is performed on the event response data according to the signed lease agreement and the digest hash in the event response data, so as to obtain the first verification result. The second legitimacy verification is performed on the event response data according to the signature information of the agreement signatory in the event response data, so as to obtain the second verification result. In response to both the first verification result and the second verification result indicating that the verification is successful, the legitimacy verification for the signed lease agreement is determined to be successful. After the legitimacy verification for the signed lease agreement is determined to be successful, an event description information of the lease agreement signing event and the signed lease agreement may be added to the blockchain.

Based on a characteristic that data may not be tampered of a blockchain technology, an integrity and an authenticity of a lease business information may be effectively ensured and a trustworthiness of a lease business processing may be effectively improved. Based on data sharing and synchronization characteristics of the blockchain technology, an efficient execution of a lease business may be effectively ensured, a multi-party collaborative lease business processing may be effectively achieved, and an efficiency of the lease business processing may be effectively improved.

FIG. 4 schematically shows a flowchart of a method of processing another agreement task according to embodiments of the present disclosure.

As shown in FIG. 4, a method 400 may include operation S210, and operations S410 to S440.

In operation S210, in response to an acquired agreement task request, a task event model and task event data associated with the agreement task request are determined as an event configuration information.

In operation S410, in response to determining the task event model as an agreement performance model, an agreement performance contract is called.

In operation S420, a parameter-input agreement performance contract is obtained by using to-be-processed agreement performance data in the task event data as variable assignment data of a parameter variable in the agreement performance contract, and the parameter-input agreement performance contract is constituted as an agreement performance event matching the agreement task request.

In operation S430, in response to acquired event response data for the agreement performance event, a legitimacy verification is performed on the event response data.

In operation S440, in response to the verification being successful, the agreement performance event and the event response data are chained in a blockchain.

An example process of steps of the method of processing the agreement task according to such embodiments will be exemplarily described below.

Exemplarily, in response to determining the task event model as the agreement performance model, the agreement performance contract is called. The parameter-input agreement performance contract is obtained by using the to-be-processed agreement performance data as the variable assignment data of the parameter variable in the agreement performance contract. The parameter-input agreement performance contract is constituted as the agreement performance event matching the agreement task request.

The agreement performance contract indicates a business processing logic matching the agreement performance event. As an example, an identification of an agreement performing party matching the agreement task request is determined. For a target business node indicated by the identification of the agreement performing party, a call notification for the parameter-input agreement performance contract is sent to the target business node, so that the target business node calls the parameter-input agreement performance contract and responds to the agreement performance event based on the business processing logic.

In response to acquired event response data of the agreement performing party for the agreement performance event, a third legitimacy verification is performed on the event response data according to an agreement performance voucher and a digest hash in the event response data, so as to obtain a third verification result. A fourth legitimacy verification is performed on the event response data according to a signature information of the agreement performing party in the event response data, so as to obtain a fourth verification result. In response to both the third verification result and the fourth verification result indicating that the verification is successful, the legitimacy verification for the event response data is determined to be successful.

An agreement performance event associated with the agreement change model includes a lease change event, and to-be-processed agreement performance data associated with the agreement change model includes a to-be-confirmed lease agreement change content. In response to determining the agreement performance model as the agreement change model, a lease change sub-contract in the agreement performance contract is called. A parameter-input lease change sub-contract is obtained by using the to-be-confirmed lease agreement change content as variable assignment data of a parameter variable in the lease change sub-contract. The parameter-input lease change sub-contract is constituted as the lease change event matching the agreement task request.

An agreement performance event associated with the rent payment model includes a rent payment event, and to-be-processed agreement performance data associated with the rent payment model includes a to-be-paid rent bill detail. In response to determining the agreement performance model as the rent payment model, a rent payment sub-contract in the agreement performance contract is called. A parameter-input rent payment sub-contract is obtained by using the to-be-paid rent bill detail as variable assignment data of a parameter variable in the rent payment sub-contract. The parameter-input rent payment sub-contract is constituted as the rent payment event matching the agreement task request.

An agreement performance event associated with the post-lease life service model includes a post-lease life service event, and to-be-processed agreement performance data associated with the post-lease life service model includes a to-be-performed life service detail. In response to determining the agreement performance model as the post-lease life service model, a life service sub-contract in the agreement performance contract is called. A parameter-input life service sub-contract is obtained by using the to-be-performed life service detail as variable assignment data of a parameter variable in the life service sub-contract. The parameter-input life service sub-contract is constituted as the post-lease life service event matching the agreement task request.

A lease change is taken as an example for description. In response to the agreement task request acquired from the lessee application side, the task event model associated with the agreement task request is determined as the agreement change model. The task event data associated with the agreement task request includes the to-be-confirmed lease agreement change content. For example, the lease agreement change content may include a lessor's identity information, an original lessee's identity information, a new lessee's identity information, a housing source location information, a rent price information, and a rent time information, etc.

According to an event model identification of the agreement change model, the smart contract identification associated with the event model identification is determined, so as to obtain the target smart contract matching the agreement task request. The target smart contract includes the lease change sub-contract in the agreement performance contract. The parameter-input lease change sub-contract is obtained by using the lease agreement change content as the variable assignment data of the parameter variable in the lease change sub-contract. The parameter-input lease change sub-contract is constituted as the lease change event. The target business node that is to respond to the lease change event is determined according to the lessor's identity information and the new lessee's identity information in the task event data.

An event response notification for the lease change event is sent to the target business node, that is, a call notification for the parameter-input lease change sub-contract is sent to the target business node, so that the target business node calls the parameter-input lease change sub-contract and responds to the lease change event based on the corresponding business processing logic.

In response to the event response data acquired from the target business node, the event response data may include, for example, a signed lease change agreement submitted by the target business node, and a signature information for the signed lease change agreement. The third legitimacy verification is performed on the event response data according to the signed lease change agreement and a digest hash in the event response data, so as to obtain the third verification result. The fourth legitimacy verification is performed on the event response data according to a signature information of the target business node in the event response data, so as to obtain the fourth verification result. In response to both the third verification result and the fourth verification result indicating that the verification is successful, the legitimacy verification for the signed lease change agreement is determined to be successful.

After the legitimacy verification for the signed lease change agreement is determined to be successful, an event description information of the lease change event and the signed lease change agreement may be added to the blockchain. Exemplarily, a lease change block may be generated based on the event description information of the lease change event and the signed lease change agreement, and the lease change block may be chained in the blockchain. After a completion of the chain, a chained lease change block may be broadcast to other nodes in the blockchain, so that the other nodes may update a payment record in the lease change block to a blockchain record list of respective nodes after receiving the broadcast.

A rent payment is taken as an example for description. In response to the agreement task request acquired from the lessor application side, the task event model associated with the agreement task request is determined as the rent payment model. The task event data associated with the agreement task request includes a rent bill detail. The rent bill detail may include, for example, a lessor's identity information, a lessor's account information, a lessee's identity information, a lessee's account information, a rent detail, and a lease time information, etc.

According to an event model identification of the rent payment model, the smart contract identification associated with the event model identification is determined, so as to obtain the target smart contract matching the agreement task request. The target smart contract includes the rent payment sub-contract in the agreement performance contract. The parameter-input rent payment sub-contract is obtained by using the rent bill detail as the variable assignment data of the parameter variable in the rent payment sub-contract. The parameter-input rent payment sub-contract is constituted as the rent payment event.

The lessee application node is determined according to the lessee's identity information in the task event data. The lessee application node constitutes a target business node that is to respond to the rent payment event. An event response notification for the rent payment event is sent to the lessee application node, that is, a call notification for the parameter-input rent payment sub-contract is sent to the lessee application node, so that the lessee application node calls the parameter-input rent payment sub-contract and responds to the rent payment event based on the corresponding business processing logic.

In response to the event response data acquired from the lessee application node, the event response data may include, for example, a rent payment voucher submitted by the lessee application node, and a signature information for the rent payment voucher. The third legitimacy verification may be performed on the event response data according to the rent payment voucher and a digest hash in the event response data, so as to obtain the third verification result. The fourth legitimacy verification is performed on the event response data according to a signature information of the lessee application node in the event response data, so as to obtain the fourth verification result. In response to both the third verification result and the fourth verification result indicating that the verification is successful, the legitimacy verification for the rent payment voucher is determined to be successful.

After the legitimacy verification for the rent payment voucher is determined to be successful, an event description information of the rent payment event and the rent payment voucher may be added to the blockchain. Exemplarily, a rent payment block may be generated based on the event description information of the rent payment event and the rent payment voucher, and the rent payment block may be chained in the blockchain. After a completion of the chain, a chained rent payment block may be broadcast to other nodes in the blockchain, so that the other nodes may update a payment record in the rent payment block to a blockchain record list of respective nodes after receiving the broadcast.

A post-lease life service is taken as an example for description. In response to the agreement task request acquired from the lessee application side, the task event model associated with the agreement task request is determined as the post-lease life service model. The task event data associated with the agreement task request includes the to-be-performed life service detail. The life service detail may include, for example, a lessee's identity information, a server's identity information, a housing source location information, a service time information, and a service item information, etc.

According to an event model identification of the post-lease life service model, the target smart contract associated with the event model identification is determined. The target smart contract includes the life service sub-contract in the agreement performance contract. The parameter-input life service sub-contract is obtained by using the to-be-performed life service detail as the variable assignment data of the parameter variable in the life service sub-contract, and the parameter-input life service sub-contract is constituted as the post-lease life service event.

A server application node is determined according to the server's identity information in the task event data. The server application node constitutes a target business node that is to respond to the post-lease life service event. An event response notification for the post-lease life service event is sent to the server application node, that is, a call notification for the parameter-input life service sub-contract is sent to the server application node, so that the server application node calls the parameter-input life service sub-contract and responds to the post-lease life service event based on the corresponding business processing logic.

In response to the event response data acquired from the server application node, the event response data may include, for example, a service execution voucher submitted by the server application node, and a signature information for the service execution voucher. The third legitimacy verification may be performed on the event response data according to the service execution voucher and a digest hash in the event response data, so as to obtain the third legitimacy verification result. The fourth legitimacy verification is performed on the event response data according to a signature information of the server application node in the event response data, so as to obtain the fourth verification result. In response to both the third legitimacy verification result and the fourth verification result indicating that the verification is successful, the legitimacy verification for the service execution voucher is determined to be successful.

In addition, a verification notification for the service execution voucher may also be sent to the lessee application node, so that the lessee application node determines whether the service execution voucher is successful. When the service execution voucher is determined to be not successful, the lessee application node may submit the agreement task request to the blockchain node again.

After the legitimacy verification for the service execution voucher is determined to be successful, an event description information of the post-lease life service event and the service execution voucher may be added to the blockchain. Exemplarily, a post-lease life service block may be generated based on the event description information of the post-lease life service event and the service execution voucher, and the post-lease life service block may be chained in the blockchain. After a completion of the chain, a chained post-lease life service block may be broadcast to other nodes in the blockchain, so that the other nodes may update a payment record in the post-lease life service block to a blockchain record list of respective nodes after receiving the broadcast.

Figure 5:
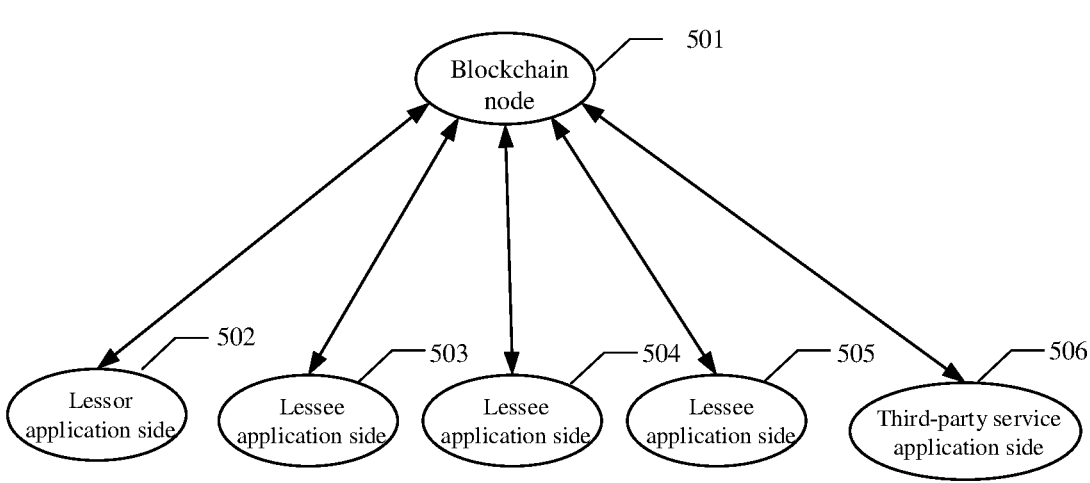
FIG. 5 schematically shows a system of processing an agreement task according to embodiments of the present disclosure.

FIG. 5 schematically shows a system of processing an agreement task according to embodiments of the present disclosure.

As shown in FIG. 5, a system 500 of processing an agreement task includes a blockchain node 501, a lessor application side 502, a lessee application side 503, a lessee application side 504, a lessee application side 505, and a third-party service application side 506. The blockchain node 501 may receive an agreement task request from any one of the lessor application side 502, the lessee application side 503, the lessee application side 504, the lessee application side 505, and the third-party service application side 506.

The blockchain node 501 may determine the event configuration information associated with the agreement task request in response to a received agreement task request. The agreement task event matching the agreement task request is generated according to the event configuration information, so that the target business node in the blockchain may respond to a task event after listening to the agreement task event. The target business node may be not only at least one of the lessor application side 502, the lessee application side 503, the lessee application side 504, the lessee application side 505, and the third-party service application side 506, but also other associated third-party application sides. For example, the target business node may be a third-party application side matching an agreement task request type.

The blockchain node 501 performs, in response to acquired event response data for the agreement task event, a legitimacy verification on the event response data. In response to the legitimacy verification being successful, the blockchain node 501 chains the agreement task event and the event response data in the blockchain.

An example process of steps of the method of processing the agreement task according to such embodiments will be exemplarily described below.

The lease agreement signing is taken as an example for description.

After a lessor and a lessee reach a lease consensus, the lessor (or lessee) may submit a lease agreement signing request to the blockchain node through an application side. The lease agreement signing request may include a to-be-signed lease agreement. The to-be-signed lease agreement may be edited by a user himself or formed by downloading a lease assignment template in the blockchain. The to-be-signed lease agreement may include a partial agreement content. The partial agreement content may include, for example, a lessor's identity information, a housing source location information, a lease price information, and a lease time information, etc.

In response to a received lease agreement signing request, the blockchain node determines the target smart contract matching the lease agreement signing request. The blockchain node may call a lease agreement creation logic declared in the target smart contract, create an agreement identification for the to-be-signed lease agreement, establish an association relationship between the agreement identification, the agreement content, and an agreement signing participant, and store the association relationship in a state database of the target smart contract.

After the association relationship is stored, the lease agreement signing logic declared in the target smart contract is called to generate a lease agreement signing event corresponding to the agreement signing participant. For example, the target smart contract matching the lease agreement signing request may be the agreement signing contract. The parameter-input agreement signing contract may be obtained by using the to-be-signed agreement detail data as the variable assignment data of the parameter variable in the agreement signing contract. The parameter-input agreement signing contract is constituted as the lease agreement signing event.

The lessee (or lessor) application side may view the to-be-signed lease agreement through the application side after listening to the lease agreement signing event. After a to-be-signed lease agreement content is determined, a lease agreement is signed to obtain a signed lease agreement. The signed lease agreement includes a signature information of the lessee (or lessor).

In response to a received agreement signing confirmation information and the signed lease agreement, the blockchain node calls the lease agreement signing logic declared in the target smart contract, generates a lease agreement signing completion event, and notifies the lessee and the lessor. The blockchain node verifies a legitimacy of the signed lease agreement according to the signature information in the agreement signing confirmation information. After the legitimacy verification is successful, the lease agreement signing completion event is generated, and an event description information of the lease agreement signing completion event and the signed lease agreement are chained in the blockchain.

The rent payment is taken as an example for description.

According to a lease time information and a lease price information in the signed lease agreement, within a preset time before a rent payment deadline, the blockchain node may call a rent payment creation logic declared in the target smart contract, create a transaction identification (ID) for a rent payment transaction, establish an association relationship between the transaction ID and a lease agreement ID, and store the association relationship in the state database of the target smart contract. After the association relationship is stored, a rent payment logic declared in the target smart contract may be called to generate a corresponding rent payment event.

The lessee application side confirms a rent payment deadline, a to-be-paid rent detail and other contents through the application side after listening to the rent payment event, and then performs a payment operation after the confirmation.

In response to a payment completion information received from the lessee application side, the blockchain node calls the rent payment logic declared in the target smart contract, generates a rent payment completion event, and notifies the lessee and the lessor. When the node fails to acquire the rent payment completion information beyond the preset time, an overdue rent replenishment logic in the target smart contract may be triggered according to a default term in the lease agreement, and a payment reminder notification may be sent to the lessee application side after adding a to-be-paid rent and a to-be-replenished fee.

The lease change is taken as an example for description.

In response to a lease cancellation request received from the lessee application side, the blockchain node calls a lease cancellation contract creation logic declared in the target smart contract, creates a transaction ID for a lease cancellation transaction, establishes an association relationship between the transaction ID and the lease agreement ID, and stores the association relationship in the state database of the target smart contract. After the association relationship is stored, a rent accounting logic declared in the target smart contract is called to automatically calculate a rent that needs to be returned and a deposit information and generate a corresponding lease cancellation event.

After listening to the lease cancellation event, the lessor application side confirms a to-be-returned rent, a to-be-returned deposit, a lease cancellation time, and a lease cancellation condition, and then performs a corresponding lease cancellation confirmation operation.

In response to a lease cancellation confirmation information received from the lessor application side, the blockchain node verifies the lease cancellation confirmation information. A house inspection appointment information is sent to the lessor application side after the verification is successful. After filling in the house inspection appointment information, the lessor application side uploads the filled house inspection appointment information to the blockchain node.

The lessor performs an offline house inspection. After the house inspection is confirmed, the lessor generates a house inspection confirmation credential and performs the lease cancellation confirmation operation. For example, the house inspection confirmation credential may be a house inspection photo. In response to the house inspection confirmation credential and the lease cancellation confirmation information received from the lessor application side, the blockchain node calls a lease cancellation contract completion logic declared in the target smart contract, generates a lease cancellation completion event, and notifies the lessee and the lessor. A third-party service is taken as an example for description.

The third-party server sends service voucher data to the blockchain node through the server application side after a service is completed. The service voucher data may include a housing source information, pre-service voucher data, and post-service voucher data, etc. The third-party service may include, for example, a cleaning service, and a maintenance service, etc.

In response to the service voucher data received from the server application side, the blockchain node calls a service contract creation logic declared in the target smart contract, creates a transaction ID for the service transaction, establishes an association relationship between the transaction ID, the lease agreement ID and a lessee ID (which may include a plurality of lessee IDs), and stores the association relationship in the state database of the target smart contract. After the association relationship is stored, a service confirmation logic declared in the target smart contract is called to generate a service confirmation event.

After listening to the service confirmation event, the lessee application side verifies the service voucher data through the application side. After the verification is successful, the lessee application side sends a service confirmation information to the blockchain node. When the verification is not successful, the lessee application side sends a service re-initiation request to the blockchain node and uploads a credential of failed verification.

In response to the service confirmation information received from all lessee application sides, the blockchain node calls a service contract completion logic declared in the target smart contract, generates a service completion event, and notifies the server and all the lessees. In response to receiving the service re-initiation request from any lessee application side, the blockchain node calls the service contract creation logic declared in the target smart contract again to generate a re-service event.

After listening to the re-service event, the server application side re-performs a service and re-sends the service voucher data to the blockchain node through the server application side. The above-mentioned operations are repeated until all lessees have completed a service confirmation. Exemplarily, the server or lessee may initiate a service appointment event before the third-party service is performed. In addition, the blockchain node may set a service period according to a service contract logic, and remind the server to perform a service operation based on the service period.

For example, the third-party service may be a cleaning service. If a house is leased in a form of shared lease, the lease-shared house may have one or more lessees. An agreement performance process of the cleaning service provided by a cleaning personnel for a plurality of lessees may include operations S501 to S506.

In operation S501, after cleaning a to-be-cleaned area of the house, such as a public area, the cleaning personnel sends cleaning data through a cleaning personnel application side. The cleaning data includes a house information and photos of houses before and after cleaning.

In operation S502, a blockchain node receives the cleaning data sent by the cleaning personnel application side. The blockchain node triggers the life service sub-contract in the agreement performance contract, that is, a cleaning smart contract logic, calls a cleaning smart contract creation logic released on the blockchain, creates a cleaning service ID for the house cleaning service, and matches and associates the cleaning service with a lease-ID-related agreement (the agreement includes the house information) according to the house information. A corresponding lessee ID (for example, including a plurality of lessees, a lessee ID1, a lessee ID2, and a lessee ID3) is called based on a matched lease agreement, so as to automatically generate a cleaning confirmation event and send the cleaning confirmation event to a plurality of lessee application sides.

In operation S503, the lessee application side views a cleaning content on the application side after listening the cleaning confirmation event. If the cleaning service is recognized, the lessee may perform a corresponding operation to complete a cleaning confirmation. If the lessee does not recognize the cleaning service, a re-cleaning request may be initiated through the lessee application side and photos of the house that has not been cleaned may be uploaded.

In operation S504, the blockchain node calls a cleaning service confirmation logic released on the blockchain based on the cleaning confirmation of the lessee application side. If it is identified that all the lessees recognize the cleaning service within a preset time, a cleaning service completion event may be generated and may be notified to the lessee application side.

If a lessee application side initiates the re-cleaning request within a preset time and does not recognize the cleaning service, a re-cleaning service event may be generated according to the re-cleaning request of the lessee.

If a plurality of lessee application sides (such as the lessee application side 503, the lessee application side 504, and the lessee application side 505) initiate the re-cleaning request within the preset time, the blockchain node sends a re-cleaning time query to the plurality of lessee application sides after receiving a plurality of re-cleaning requests. If it is identified that re-cleaning time fed back by the plurality of lessee application sides is inconsistent, a coordination time notification is sent to the plurality of lessee application sides, and a coordinated cleaning time is sent to the cleaning personnel application sides.

Optionally, the coordination time notification is used to notify that the plurality of lessees need to carry out an offline coordination to reach a consensus on the re-cleaning time. After the plurality of lessees reach the consensus on the re-cleaning time through the offline coordination, the coordinated re-cleaning time may be sent to the blockchain node through one lessee application side, and then the blockchain node may send the confirmation operation to remaining lessee application sides of the plurality of lessees, and the re-cleaning time may be confirmed online. Optionally, the coordination time notification is used to notify that the plurality of lessees need to reach a consensus on the re-cleaning time online through the lessee application side. Each lessee may select a plurality of candidate re-cleaning times on the lessee application side, and the plurality of lessees may see time selected by others. The blockchain node may use consistent time selected by the plurality of lessees as the re-cleaning time, and the re-cleaning time may be confirmed online through the plurality of lessee application sides.

In operation S505, after the cleaning personnel application side listens to the re-cleaning service event, the cleaning personnel views the re-cleaning service event through the cleaning personnel application side, re-performs the cleaning service of the house, and sends updated cleaning data. After receiving the updated cleaning data, the blockchain node may automatically generate an updated cleaning confirmation event and send the updated cleaning confirmation event to the lessee application side that initiates the re-cleaning request.

In operation S506, the lessee application side performs a confirmation after listening to the cleaning confirmation event. After receiving a confirmation information, the blockchain node generates the cleaning service completion event and notifies the lessee.

A housing source information viewing is taken as an example for description.

In response to a housing source information viewing request received from the third-party application side, the blockchain node determines a housing source manager identification according to a housing source identification information in the housing source information viewing request. The housing source identification information may include, for example, housing source number data, and a housing source address information, etc. The blockchain node sends an authorization request for the housing source information viewing to a housing source manager indicated by the housing source manager identification.

After receiving the authorization request, the housing source manager may perform an authorization confirmation for the housing source information viewing. An authorization confirmation information includes a private key signature of the housing source manager.

In response to the authorization confirmation information received from the housing source manager, the blockchain node verifies a legitimacy of the authorization confirmation information according to the private key signature in the authorization confirmation information. After the legitimacy verification is successful, lease agreement data is matched according to the housing source identification information, and a lease history information in which the lessee's identity information is hidden is generated. In addition, a service history information may also be matched according to the housing source identification information, and the service history information may include, for example, a cleaning history information and a maintenance history information. A housing source information viewing event is generated according to the lease history information and the service history information matching the housing source identification information.

The third-party application side may view a housing source information through the application side after listening to the housing source information viewing event.

By introducing a blockchain technology and taking advantage of decentralized characteristics of blockchain data, an authenticity and a security of the lease business information may be effectively ensured, an efficient and reliable lease business may be achieved, interests of both the lessee and the lessee may be ensured, a reliable data support may be improved for a lease business supervision, an efficiency of a lease contract performance may be effectively improved, and a human cost consumption for a lease contract performance may be reduced.

Figure 6:
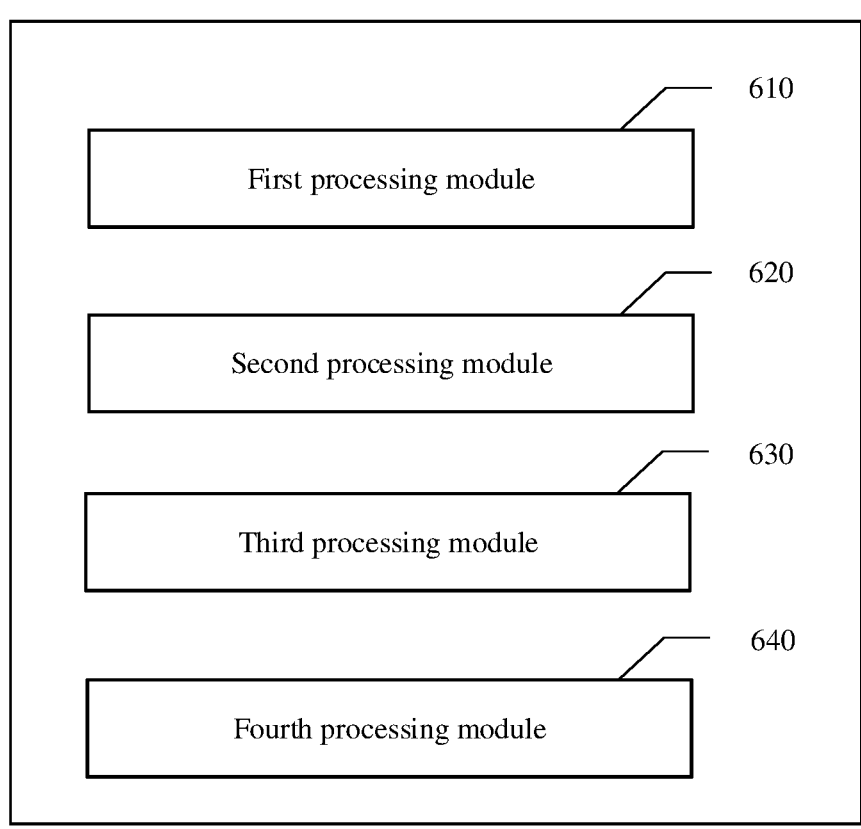
FIG. 6 schematically shows an apparatus of processing an agreement task according to embodiments of the present disclosure.

FIG. 6 schematically shows an apparatus of processing an agreement task according to embodiments of the present disclosure.

As shown in FIG. 6, an apparatus 600 of processing an agreement task may include a first processing module 610, a second processing module 620, a third processing module 630, and a fourth processing module 640.

The first processing module 610 is used to determine, in response to an acquired agreement task request, a task event model and task event data associated with the agreement task request as an event configuration information. The second processing module 620 is used to call a target smart contract associated with the event configuration information, so as to generate an agreement task event matching the agreement task request based on the target smart contract. The third processing module 630 is used to perform, in response to acquired event response data of a target business node for the agreement task event, a legitimacy verification on the event response data. The fourth processing module 640 is used to chain, in response to the verification being successful, the agreement task event and the event response data in a blockchain.

According to embodiments of the present disclosure, in response to the acquired agreement task request, the task event model and the task event data associated with the agreement task request are determined as the event configuration information; the target smart contract associated with the event configuration information is called to generate the agreement task event matching the agreement task request based on the target smart contract; in response to the acquired event response data of the target business node for the agreement task event, the legitimacy verification is performed on the event response data; and in response to the verification being successful, the agreement task event and the event response data are chained in the blockchain.

The agreement task event matching the agreement task request is generated according to the event configuration information associated with the agreement task request, so that the target business node in the blockchain may respond to a task event after listening to the agreement task event, which may effectively improve an efficiency of an agreement task processing and improve an automation level and an intelligence level of the agreement task processing. The legitimacy verification for the event response data may effectively ensure an authenticity of the event response data, and may effectively improve a security and a credibility of the agreement task processing. The agreement task processing performed based on the blockchain may effectively ensure a transparency of the agreement task processing, may effectively achieve a sharing and a synchronization of an agreement task information, and may be conductive to achieving an efficient and reliable agreement task processing process.

According to embodiments of the present disclosure, the task event model includes an agreement signing model, task event data associated with the agreement signing model includes to-be-signed agreement detail data, and an agreement task event associated with the agreement signing model includes an agreement signing event. The second processing module includes: a first processing sub-module used to call an agreement signing contract in response to determining the task event model as the agreement signing model; and a second processing sub-module used to obtain a parameter-input agreement signing contract by using the to-be-signed agreement detail data as variable assignment data of a parameter variable in the agreement signing contract, and the parameter-input agreement signing contract is constituted as the agreement signing event matching the agreement task request.

According to embodiments of the present disclosure, the third processing module includes: a third processing sub-module used to perform, in response to acquired event response data of an agreement signatory for the agreement signing event, a first legitimacy verification on the event response data according to contract signing data and a digest hash in the event response data, so as to obtain a first verification result; and a fourth sub-module used to perform a second legitimacy verification on the event response data according to a signature information of the agreement signatory in the event response data, so as to obtain a second verification result, and determine, in response to both the first verification result and the second verification result indicating that the verification is successful, the legitimacy verification of the event response data to be successful. The contract signing data includes data obtained from a signing of the agreement detail data by the agreement signatory.

According to embodiments of the present disclosure, the fourth sub-module includes: a first processing unit used to determine an assigned public key of the agreement signatory according to a user certificate associated with the agreement signatory; a second processing unit used to decrypt the signature information of the agreement signatory by using the public key, so as to obtain a first response data hash value; and a third processing unit used to perform a hash calculation for the event response data according to the agreement signing model and an identification of the agreement signatory, so as to obtain a second response data hash value, and determine, in response to the first response data hash value being consistent with the second response data hash value, the second legitimacy verification of the event response data to be successful. The user certificate is generated by a certificate authority according to an identity information of the agreement signatory and the assigned public key.

According to embodiments of the present disclosure, the task event model includes an agreement performance model, task event data associated with the agreement performance model includes to-be-processed agreement performance data, and an agreement task event associated with the agreement performance model includes an agreement performance event. The second processing module includes: a fifth processing sub-module used to call an agreement performance contract in response to determining the task event model as the agreement performance model, so as to generate the agreement performance event matching the agreement task request based on the agreement performance contract. The agreement performance model includes at least one of: an agreement change model, an agreement termination model, a rent payment model, a financial service model and a post-lease life service model.

According to embodiments of the present disclosure, the fifth processing sub-module includes: a fourth processing unit used to obtain a parameter-input agreement performance contract by using the to-be-processed agreement performance data as variable assignment data of a parameter variable in the agreement performance contract, and constitute the parameter-input agreement performance contract as the agreement performance event matching the agreement task request.

According to embodiments of the present disclosure, the agreement performance contract indicates a business processing logic matching the agreement performance event. The apparatus further includes: the second processing module including: a sixth processing sub-module used to determine an identification of an agreement performing party matching the agreement task request, and send, for a target business node indicated by the identification of the agreement performing party, a call notification for the parameter-input agreement performance contract to the target business node, so that the target business node calls the parameter-input agreement performance contract and responds to the agreement performance event based on the business processing logic.

According to embodiments of the present disclosure, the third processing module includes: a seventh processing sub-module used to perform, in response to acquired event response data of an agreement performing party for the agreement performance event, a third legitimacy verification on the event response data according to an agreement performance voucher and a digest hash in the event response data, so as to obtain a third verification result; and an eighth processing sub-module used to perform a fourth legitimacy verification on the event response data according to a signature information of the agreement performing party in the event response data, so as to obtain a fourth verification result, and determine, in response to both the third verification result and the fourth verification result indicating that the verification is successful, the legitimacy verification for the event response data to be successful.

According to embodiments of the present disclosure, an agreement performance event associated with the agreement change model includes a lease change event, and to-be-processed agreement performance data associated with the agreement change model includes a to-be-confirmed lease agreement change content. The fifth processing sub-module includes: a fifth processing unit used to call, in response to determining the agreement performance model as the agreement change model, a lease change sub-contract in the agreement performance contract; and a sixth processing unit used to obtain a parameter-input lease change sub-contract by using the to-be-confirmed lease agreement change content as variable assignment data of a parameter variable in the lease change sub-contract, and constitute the parameter-input lease change sub-contract as the lease change event matching the agreement task request.

According to embodiments of the present disclosure, an agreement performance event associated with the rent payment model includes a rent payment event, and to-be-processed agreement performance data associated with the rent payment model includes a to-be-paid rent bill detail. The fifth processing sub-module includes: a seventh processing unit used to call, in response to determining the agreement performance model as the rent payment model, a rent payment sub-contract in the agreement performance contract; and an eighth processing unit used to obtain a parameter-input rent payment sub-contract by using the to-be-paid rent bill detail as variable assignment data of a parameter variable in the rent payment sub-contract, and constitute the parameter-input rent payment sub-contract as the rent payment event matching the agreement task request.

According to embodiments of the present disclosure, an agreement performance event associated with the post-lease life service model includes a post-lease life service event, and to-be-processed agreement performance data associated with the post-lease life service model includes a to-be-performed life service detail. The fifth processing sub-module includes: a ninth processing unit used to call, in response to determining the agreement performance model as the post-lease life service model, a life service sub-contract in the agreement performance contract; and a tenth processing unit used to obtain a parameter-input life service sub-contract by using the to-be-performed life service detail as variable assignment data of a parameter variable in the life service sub-contract, and constitute the parameter-input life service sub-contract as the post-lease life service event matching the agreement task request.

According to embodiments of the present disclosure, the apparatus further includes a fifth processing module used to, before generating the agreement task event matching the agreement task request, perform a business verification on the agreement task request according to authentication data referenced by the agreement task request, and in response to the business verification being successful, perform an operation of generating the agreement task event matching the agreement task request. The authentication data includes authentication root data and non-authentication root data. The authentication root data includes property right certification data which is pre-certified by a property right certification authority. The non-authentication root data includes at least one of: housing source number data referencing the property right certification data, lease agreement data referencing the housing source number data, and service agreement data referencing the housing source number data and/or the lease agreement data.

According to embodiments of the present disclosure, the apparatus further includes a sixth processing module used to initiate a query in the blockchain by using a data digest of the authentication data as a query index, so as to obtain other agreement task events referencing the authentication data, and record the other agreement task events and the agreement task event matching the agreement task request in a business data chain in which the authentication data is used as a root node.

According to embodiments of the present disclosure, the fourth processing module includes: a ninth processing sub-module used to calculate a target hash value according to the agreement task event and the event response data; a tenth processing sub-module used to generate a block head according to a referenced hash value of a previous block in a blockchain record list based on a hash value of the previous block, the target hash value, and a timestamp, and generate a block body based on the agreement task event and the event response data, and the block head and the block body constitute an agreement task block; an eleventh processing sub-module used to chain the agreement task block in the blockchain; and a twelfth processing sub-module used to broadcast an chained agreement task block in the blockchain, so that each node in the blockchain updates a record information in the agreement task block to a blockchain list of the node.

Figure 7:
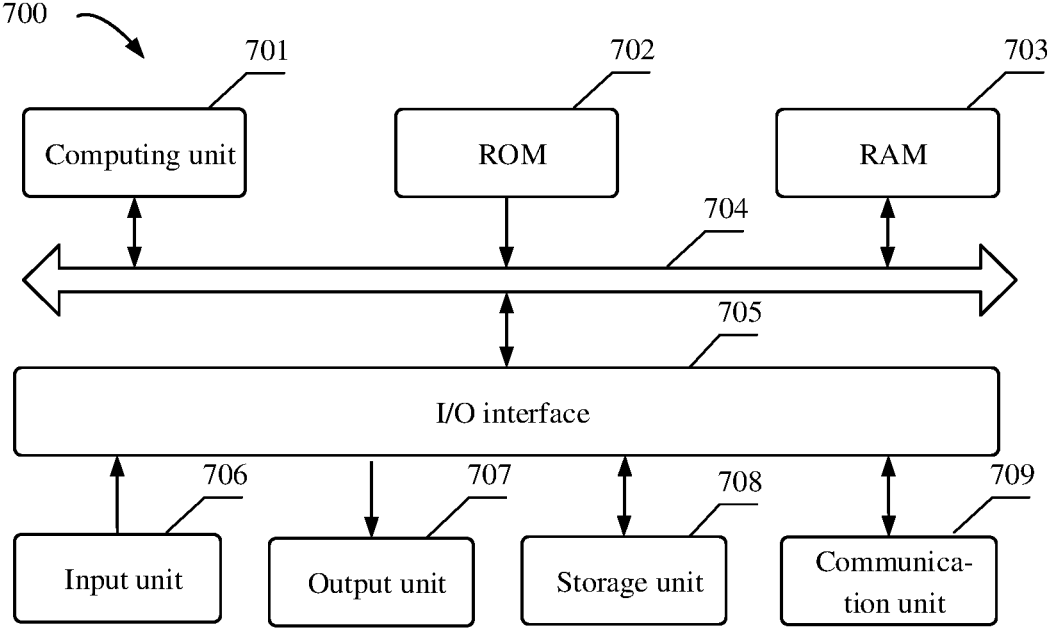
FIG. 7 schematically shows a schematic block diagram of an electronic device according to embodiments of the present disclosure.

FIG. 7 shows a schematic block diagram of an electronic device according to embodiments of the present disclosure. The electronic device is intended to represent various forms of digital computers, such as a laptop computer, a desktop computer, a workstation, a personal digital assistant, a server, a blade server, a mainframe computer, and other suitable computers. The electronic device may further represent various forms of mobile devices, such as a personal digital assistant, a cellular phone, a smart phone, a wearable device, and other similar computing devices. The components as illustrated herein, and connections, relationships, and functions thereof are merely examples, and are not intended to limit the implementation of the present disclosure described and/or required herein.

As shown in FIG. 7, the electronic device 700 includes a computing unit 701 which may perform various appropriate actions and processes according to a computer program stored in a read only memory (ROM) 702 or a computer program loaded from a storage unit 708 into a random access memory (RAM) 703. In the RAM 703, various programs and data necessary for an operation of the electronic device 700 may also be stored. The computing unit 701, the ROM 702 and the RAM 703 are connected to each other through a bus 704. An input/output (I/O) interface 705 is also connected to the bus 704.

A plurality of components in the electronic device 700 are connected to the I/O interface 705, including: an input unit 706, such as a keyboard, or a mouse; an output unit 707, such as displays or speakers of various types; a storage unit 708, such as a disk, or an optical disc; and a communication unit 709, such as a network card, a modem, or a wireless communication transceiver. The communication unit 709 allows the electronic device 700 to exchange information/data with other devices through a computer network such as Internet and/or various telecommunication networks.

The computing unit 701 may be various general-purpose and/or dedicated processing assemblies having processing and computing capabilities. Some examples of the computing units 701 include, but are not limited to, a central processing unit (CPU), a graphics processing unit (GPU), various dedicated artificial intelligence (AI) computing chips, various computing units that run machine learning model algorithms, a digital signal processing processor (DSP), and any suitable processor, controller, microcontroller, etc. The computing unit 701 executes various methods and steps described above, such as the method of processing the agreement task. For example, in some embodiments, the method of processing the agreement task may be implemented as a computer software program which is tangibly embodied in a machine-readable medium, such as the storage unit 708. In some embodiments, the computer program may be partially or entirely loaded and/or installed in the electronic device 700 via the ROM 702 and/or the communication unit 709. The computer program, when loaded in the RAM 703 and executed by the computing unit 701, may execute one or more steps in the method of processing the agreement task described above. Alternatively, in other embodiments, the computing unit 701 may be configured to perform the method of processing the agreement task by any other suitable means (e.g., by means of firmware).

Various embodiments of the systems and technologies described herein may be implemented in a digital electronic circuit system, an integrated circuit system, a field programmable gate array (FPGA), an application specific integrated circuit (ASIC), an application specific standard product (ASSP), a system on chip (SOC), a complex programmable logic device (CPLD), a computer hardware, firmware, software, and/or combinations thereof. These various embodiments may be implemented by one or more computer programs executable and/or interpretable on a programmable system including at least one programmable processor. The programmable processor may be a dedicated or general-purpose programmable processor, which may receive data and instructions from a storage system, at least one input device and at least one output device, and may transmit the data and instructions to the storage system, the at least one input device, and the at least one output device.

Program codes for implementing the methods of the present disclosure may be written in one programming language or any combination of more programming languages. These program codes may be provided to a processor or controller of a general-purpose computer, a dedicated computer or other programmable data processing apparatus, such that the program codes, when executed by the processor or controller, cause the functions/operations specified in the flowcharts and/or block diagrams to be implemented. The program codes may be executed entirely on a machine, partially on a machine, partially on a machine and partially on a remote machine as a stand-alone software package or entirely on a remote machine or server.

In the context of the present disclosure, a machine-readable medium may be a tangible medium that may contain or store a program for use by or in connection with an instruction execution system, an apparatus or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the above. More specific examples of the machine-readable storage medium may include an electrical connection based on one or more wires, a portable computer disk, a hard disk, a random access memory (RAM), a read only memory (ROM), an erasable programmable read only memory (EPROM or a flash memory), an optical fiber, a compact disk read only memory (CD-ROM), an optical storage device, a magnetic storage device, or any suitable combination of the above.

In order to provide interaction with the user, the systems and technologies described here may be implemented on a computer including a display device (for example, a CRT (cathode ray tube) or LCD (liquid crystal display) monitor) for displaying information to the user, and a keyboard and a pointing device (for example, a mouse or a trackball) through which the user may provide the input to the computer. Other types of devices may also be used to provide interaction with the user. For example, a feedback provided to the user may be any form of sensory feedback (for example, visual feedback, auditory feedback, or tactile feedback), and the input from the user may be received in any form (including acoustic input, voice input or tactile input).

The systems and technologies described herein may be implemented in a computing system including back-end components (for example, a data server), or a computing system including middleware components (for example, an application server), or a computing system including front-end components (for example, a user computer having a graphical user interface or web browser through which the user may interact with the implementation of the system and technology described herein), or a computing system including any combination of such back-end components, middleware components or front-end components. The components of the system may be connected to each other by digital data communication (for example, a communication network) in any form or through any medium. Examples of the communication network include a local area network (LAN), a wide area network (WAN), and the Internet.

The computer system may include an application side and a server. The application side and the server are generally far away from each other and usually interact through a communication network. The relationship between the application side and the server is generated through computer programs running on the corresponding computers and having an application side-server relationship with each other.

It should be understood that steps of the processes illustrated above may be reordered, added or deleted in various manners. For example, the steps described in the present disclosure may be performed in parallel, sequentially, or in a different order, as long as a desired result of the technical solution of the present disclosure may be achieved. This is not limited in the present disclosure.

The above-mentioned specific embodiments do not constitute a limitation on the scope of protection of the present disclosure. Those skilled in the art should understand that various modifications, combinations, sub-combinations and substitutions may be made according to design requirements and other factors. Any modifications, equivalent replacements and improvements made within the spirit and principles of the present disclosure shall be included in the scope of protection of the present disclosure.

What is claimed is:

1. A method of processing an agreement task, comprising:
   determining, by a blockchain node, in response to an acquired agreement task request, a task event model and task event data associated with the agreement task request as an event configuration information;
   calling, by the blockchain node, a target smart contract associated with the event configuration information, so as to generate an agreement task event matching the agreement task request based on the target smart contract;

performing, by the blockchain node, in response to acquired event response data of a target business node for the agreement task event, a legitimacy verification on the event response data; and
   chaining, by the blockchain node, in response to the verification being successful, the agreement task event and the event response data in a blockchain, wherein
   the task event model comprises an agreement signing model, task event data associated with the agreement signing model comprises to-be-signed agreement detail data, and an agreement task event associated with the agreement signing model comprises an agreement signing event; and
   the calling, by the blockchain node, a target smart contract associated with the event configuration information, so as to generate an agreement task event matching the agreement task request based on the target smart contract comprises:
      calling an agreement signing contract in response to determining the task event model as the agreement signing model;
      obtaining a parameter-input agreement signing contract by using the to-be-signed agreement detail data as variable assignment data of a parameter variable in the agreement signing contract; and
      constituting the parameter-input agreement signing contract as the agreement signing event matching the agreement task request.

2. The method according to claim 1, wherein the performing, by the blockchain node, in response to acquired event response data of a target business node for the agreement task event, a legitimacy verification on the event response data comprises:
   performing, in response to acquired event response data of an agreement signatory for the agreement signing event, a first legitimacy verification on the event response data according to contract signing data and a digest hash in the event response data, so as to obtain a first verification result;
   performing a second legitimacy verification on the event response data according to a signature information of the agreement signatory in the event response data, so as to obtain a second verification result; and
   determining, in response to both the first verification result and the second verification result indicating that the verification is successful, the legitimacy verification for the event response data to be successful,
   wherein the contract signing data comprises data obtained from a signing of the agreement detail data by the agreement signatory.

3. The method according to claim 2, wherein the performing a second legitimacy verification on the event response data according to a signature information of the agreement signatory in the event response data, so as to obtain a second verification result comprises:
   determining an assigned public key of the agreement signatory according to a user certificate associated with the agreement signatory;
   decrypting the signature information of the agreement signatory by using the public key, so as to obtain a first response data hash value;
   performing a hash calculation for the event response data according to the agreement signing model and an identification of the agreement signatory, so as to obtain a second response data hash value; and
   determining, in response to the first response data hash value being consistent with the second response data hash value, the second legitimacy verification for the event response data to be successful, wherein the user certificate is generated by a certificate authority according to an identity information of the agreement signatory and the assigned public key.

4. The method according to claim 1, wherein the task event model comprises an agreement performance model, task event data associated with the agreement performance model comprises to-be-processed agreement performance data, and an agreement task event associated with the agreement performance model comprises an agreement performance event; and the calling, by the blockchain node, a target smart contract associated with the event configuration information, so as to generate an agreement task event matching the agreement task request based on the target smart contract comprises:

calling an agreement performance contract in response to determining the task event model as the agreement performance model, so as to generate the agreement performance event matching the agreement task request based on the agreement performance contract, wherein the agreement performance model comprises at least one of: an agreement change model, an agreement termination model, a rent payment model, a financial service model and a post-lease life service model.

5. The method according to claim 4, wherein the calling an agreement performance contract in response to determining the task event model as the agreement performance model, so as to generate the agreement performance event matching the agreement task request based on the agreement performance contract comprises:

obtaining a parameter-input agreement performance contract by using the to-be-processed agreement performance data as variable assignment data of a parameter variable in the agreement performance contract; and constituting the parameter-input agreement performance contract as the agreement performance event matching the agreement task request.

6. The method according to claim 5, wherein the agreement performance contract indicates a business processing logic matching the agreement performance event; and the method further comprises:

determining an identification of an agreement performing party matching the agreement task request; and sending, for a target business node indicated by the identification of the agreement performing party, a call notification for the parameter-input agreement performance contract to the target business node, so that the target business node calls the parameter-input agreement performance contract and responds to the agreement performance event based on the business processing logic.

7. The method according to claim 4, wherein the performing, by the blockchain node, in response to acquired event response data of a target business node for the agreement task event, a legitimacy verification on the event response data comprises:

performing, in response to acquired event response data of an agreement performing party for the agreement performance event, a third legitimacy verification on the event response data according to an agreement performance voucher and a digest hash in the event response data, so as to obtain a third verification result;

performing a fourth legitimacy verification on the event response data according to a signature information of the agreement performing party in the event response data, so as to obtain a fourth verification result; and determining, in response to both the third verification result and the fourth verification result indicating that the verification is successful, the legitimacy verification for the event response data to be successful.

8. The method according to claim 4, wherein an agreement performance event associated with the agreement change model comprises a lease change event, and to-be-processed agreement performance data associated with the agreement change model comprises a to-be-confirmed lease agreement change content; and the calling an agreement performance contract in response to determining the task event model as the agreement performance model, so as to generate an agreement performance event matching the agreement task request based on the agreement performance contract comprises:

calling, in response to determining the agreement performance model as the agreement change model, a lease change sub-contract in the agreement performance contract, wherein the agreement performance contract comprises the lease change sub-contract;

obtaining a parameter-input lease change sub-contract by using the to-be-confirmed lease agreement change content as variable assignment data of a parameter variable in the lease change sub-contract; and constituting the parameter-input lease change sub-contract as the lease change event matching the agreement task request.

9. The method according to claim 4, wherein an agreement performance event associated with the rent payment model comprises a rent payment event, and to-be-processed agreement performance data associated with the rent payment model comprises a to-be-paid rent bill detail; and the calling an agreement performance contract in response to determining the task event model as the agreement performance model, so as to generate an agreement performance event matching the agreement task request based on the agreement performance contract comprises:

calling, in response to determining the agreement performance model as the rent payment model, a rent payment sub-contract in the agreement performance contract, wherein the agreement performance contract comprises the rent payment sub-contract;

obtaining a parameter-input rent payment sub-contract by using the to-be-paid rent bill detail as variable assignment data of a parameter variable in the rent payment sub-contract; and constituting the parameter-input rent payment sub-contract as the rent payment event matching the agreement task request.

10. The method according to claim 4, wherein an agreement performance event associated with the post-lease life service model comprises a post-lease life service event, and to-be-processed agreement performance data associated with the post-lease life service model comprises a to-be-performed life service detail; and the calling an agreement performance contract in response to determining the task event model as the agreement performance model, so as to generate an agreement performance event matching the agreement task request based on the agreement performance contract comprises:

calling, in response to determining the agreement performance model as the post-lease life service model, a life service sub-contract in the agreement performance contract, wherein the agreement performance contract comprises the life service sub-contract;

obtaining a parameter-input life service sub-contract by using the to-be-performed life service detail as variable assignment data of a parameter variable in the life service sub-contract; and constituting the parameter-input life service sub-contract as the post-lease life service event matching the agreement task request.

11. The method according to claim 1, further comprising: before generating the agreement task event matching the agreement task request, performing a business verification on the agreement task request according to authentication data referenced by the agreement task request, and in response to the business verification being successful, performing an operation of generating the agreement task event matching the agreement task request, wherein the authentication data comprises authentication root data and non-authentication root data, and the authentication root data comprises property right certification data which is pre-certified by a property right certification authority, and wherein the non-authentication root data comprises at least one of: housing source number data referencing the property right certification data, lease agreement data referencing the housing source number data, and service agreement data referencing the housing source number data and/or the lease agreement data.

12. The method according to claim 11, further comprising:

initiating a query in the blockchain by using a data digest of the authentication data as a query index, so as to obtain other agreement task events referencing the authentication data; and recording the other agreement task events and the agreement task event matching the agreement task request into a business data chain in which the authentication data is used as a root node.

13. The method according to claim 1, wherein the chaining, by the blockchain node, the agreement task event and the event response data in the blockchain comprises:

calculating a target hash value according to the agreement task event and the event response data;

generating a block head according to a referenced hash value of a previous block in a blockchain record list based on a hash value of the previous block, the target hash value, and a timestamp, and generating a block body based on the agreement task event and the event response data, wherein the block head and the block body constitute an agreement task block;

chaining the agreement task block in the blockchain; and broadcasting an on-chained agreement task block in the blockchain, so that each node in the blockchain updates a record information in the agreement task block to a blockchain list of the node.

14. An electronic device, comprising:

at least one processor; and a memory communicatively connected to the at least one processor;

wherein the memory stores instructions executable by the at least one processor, and the instructions, when executed by the at least one processor, cause the at least one processor to implement the method according to claim 1.

15. A non-transitory computer-readable storage medium having executable instructions stored thereon, wherein the instructions, when executed by a processor, cause the processor to implement the method according to claim 1.

16. The non-transitory computer-readable storage medium according to claim 15, wherein the task event model comprises an agreement signing model, task event data associated with the agreement signing model comprises to-be-signed agreement detail data, and an agreement task event associated with the agreement signing model comprises an agreement signing event; and the calling, by the blockchain node, a target smart contract associated with the event configuration information, so as to generate an agreement task event matching the agreement task request based on the target smart contract comprises:

calling an agreement signing contract in response to determining the task event model as the agreement signing model;

obtaining a parameter-input agreement signing contract by using the to-be-signed agreement detail data as variable assignment data of a parameter variable in the agreement signing contract; and constituting the parameter-input agreement signing contract as the agreement signing event matching the agreement task request.

17. The non-transitory computer-readable storage medium according to claim 16, wherein the performing, by the blockchain node, in response to acquired event response data of a target business node for the agreement task event, a legitimacy verification on the event response data comprises:

performing, in response to acquired event response data of an agreement signatory for the agreement signing event, a first legitimacy verification on the event response data according to contract signing data and a digest hash in the event response data, so as to obtain a first verification result;

performing a second legitimacy verification on the event response data according to a signature information of the agreement signatory in the event response data, so as to obtain a second verification result; and determining, in response to both the first verification result and the second verification result indicating that the verification is successful, the legitimacy verification for the event response data to be successful, wherein the contract signing data comprises data obtained from a signing of the agreement detail data by the agreement signatory.

18. The electronic device according to claim 14, wherein the task event model comprises an agreement signing model, task event data associated with the agreement signing model comprises to-be-signed agreement detail data, and an agreement task event associated with the agreement signing model comprises an agreement signing event; and the calling, by the blockchain node, a target smart contract associated with the event configuration information, so as to generate an agreement task event matching the agreement task request based on the target smart contract comprises:

calling an agreement signing contract in response to determining the task event model as the agreement signing model;

obtaining a parameter-input agreement signing contract by using the to-be-signed agreement detail data as variable assignment data of a parameter variable in the agreement signing contract; and constituting the parameter-input agreement signing contract as the agreement signing event matching the agreement task request.

19. The electronic device according to claim 18, wherein the performing, by the blockchain node, in response to acquired event response data of a target business node for the agreement task event, a legitimacy verification on the event response data comprises:

performing, in response to acquired event response data of an agreement signatory for the agreement signing event, a first legitimacy verification on the event response data according to contract signing data and a digest hash in the event response data, so as to obtain a first verification result;

performing a second legitimacy verification on the event response data according to a signature information of the agreement signatory in the event response data, so as to obtain a second verification result; and determining, in response to both the first verification result and the second verification result indicating that the verification is successful, the legitimacy verification for the event response data to be successful, wherein the contract signing data comprises data obtained from a signing of the agreement detail data by the agreement signatory.

* * * * *